US012734569B2

(12) United States Patent
Schulze-Kraasch et al.

(10) Patent No.: US 12,734,569 B2
(45) Date of Patent: Sep. 15, 2026

(54) FLAT METAL PRODUCT AND COMPONENT BASED THEREON

(71) Applicant: ThyssenKrupp Steel Europe AG, Duisburg (DE)

(72) Inventors: Folkert Schulze-Kraasch, Duisburg (DE); Andreas Birkenstock, Velbert (DE); Marius Kaiser, Moers (DE); Oliver Vogt, Dortmund (DE); Stefan Woestmann, Ahlen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 18 days.

(21) Appl. No.: 18/865,078

(22) PCT Filed: May 23, 2023

(86) PCT No.: PCT/EP2023/063713
§ 371 (c)(1),
(2) Date: Nov. 12, 2024

(87) PCT Pub. No.: WO2023/232547
PCT Pub. Date: Dec. 7, 2023

(65) Prior Publication Data

US 2025/0312833 A1 Oct. 9, 2025

(30) Foreign Application Priority Data

Jun. 1, 2022 (DE) ..................... 10 2022 113 809.7

(51) Int. Cl.
*B32B 15/01* (2006.01)
*B21B 1/22* (2006.01)

(52) U.S. Cl.
CPC ............ *B21B 1/227* (2013.01); *B32B 15/012* (2013.01); *B32B 15/013* (2013.01); *B32B 2311/20* (2013.01); *B32B 2311/24* (2013.01); *B32B 2311/30* (2013.01)

(58) Field of Classification Search
None
See application file for complete search history.

(56) References Cited

U.S. PATENT DOCUMENTS 5,532,051 A 7/1996 Nishiura et al.
11,421,309 B2 * 8/2022 Kamat ................ B62D 29/008
2011/0165430 A1 * 7/2011 Hesse .................. B21B 27/005 428/141
2019/0337032 A1 11/2019 Chen et al.

FOREIGN PATENT DOCUMENTS

DE 68910866 T2 3/1994
DE 60000331 T2 5/2003
DE 102012017703 A1 3/2014
DE 102016102723 B 6/2017
EP 0761324 A1 3/1997
(Continued)

OTHER PUBLICATIONS

DIN EN 10049:2014.03.
(Continued)

*Primary Examiner* — Daniel J. Schleis
(74) *Attorney, Agent, or Firm* — RMCK Law Group PLC

(57) ABSTRACT

The invention relates to a flat metal product and to a component produced therefrom.

18 Claims, 4 Drawing Sheets

(56) References Cited

FOREIGN PATENT DOCUMENTS

Figure 1:
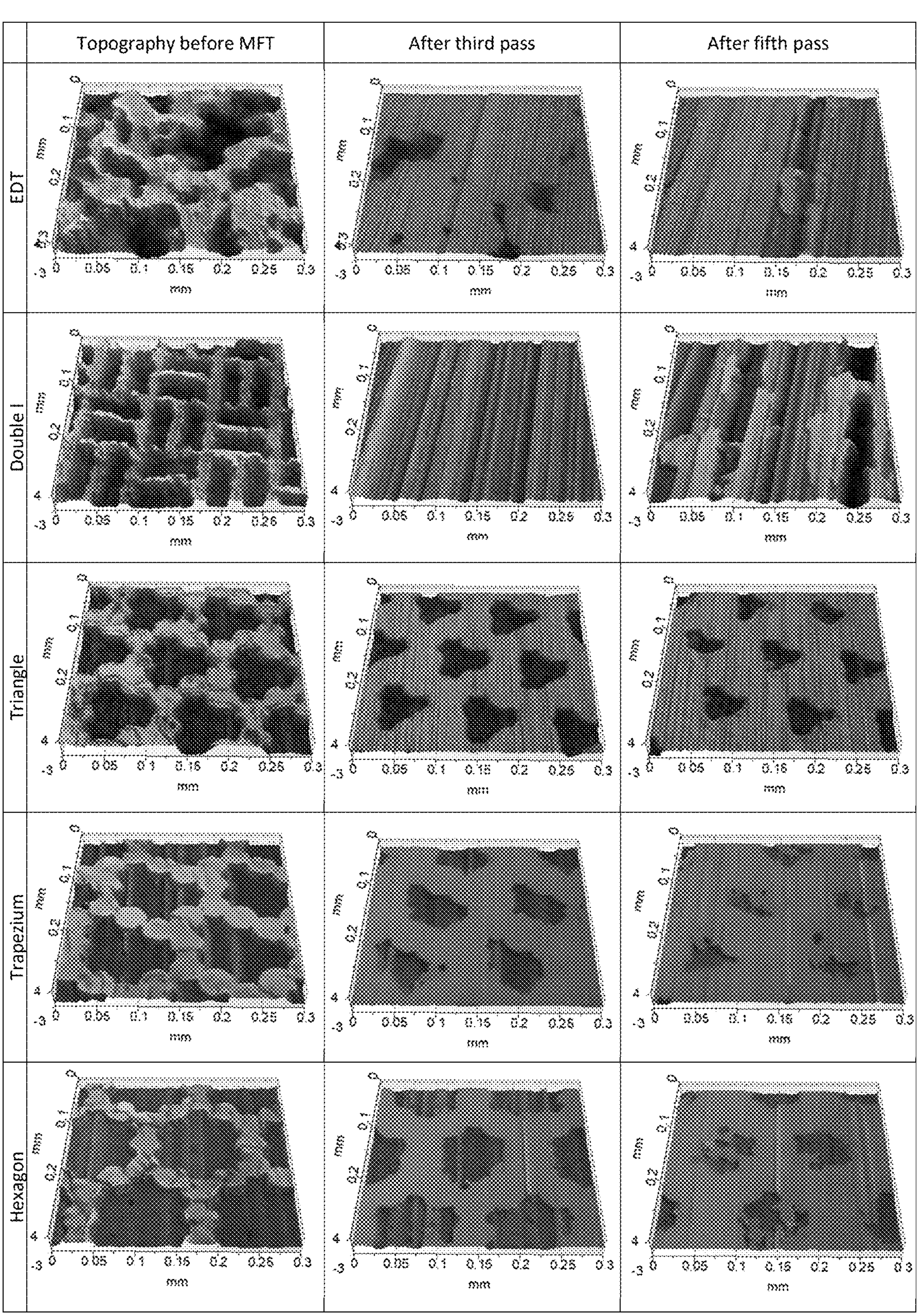

| | | | |
|---|---|---|---|
| EP | 2006037 | B1 | 12/2008 |
| EP | 2892663 | B1 | 7/2015 |
| EP | 3172006 | B1 | 5/2017 |
| EP | 3877112 | A1 | 9/2021 |
| EP | 3925713 | A1 | 12/2021 |
| WO | 2017125497 | A1 | 7/2017 |
| WO | 2017144407 | A1 | 8/2017 |
| WO | 2020094450 | A1 | 5/2020 |
| WO | 2021013938 | A1 | 1/2021 |
| WO | 2021052809 | A1 | 3/2021 |
| WO | 2021053088 | A1 | 3/2021 |
| WO | 2021069247 | A1 | 4/2021 |

OTHER PUBLICATIONS

German Office Action for DE Application No. 102022113809.7 mailed Apr. 25, 2023.

International Search Report and Written Opinion for International Application No. PCT/EP2023/063713 mailed Jul. 5, 2023.

* cited by examiner

FLAT METAL PRODUCT AND COMPONENT BASED THEREON

CROSS-REFERENCE TO RELATED APPLICATIONS

This application is a 371 U.S. National Stage of International Application No. PCT/EP2023/063713 filed May 23, 2023 which claims the benefit of German Patent Application No. 10 2022 113 809.7 filed Jun. 1, 2022. The disclosures of each of the above applications are incorporated herein by reference in their entirety.

The invention relates to a flat metal product and to a component produced therefrom.

Sheet metal materials, for example made from a steel material for use in the automotive sector, are generally provided with a zinc-containing coating, for example a zinc coat having low aluminum contents in particular from the melt (Z), a zinc-based coat having proportions of aluminum and magnesium from the melt (ZM), a zinc or zinc-based coat (ZF) that has been heat treated after hot dip coating, and an electrolytically applied zinc coat (ZE). The zinc has the function of protecting the steel material from corrosion as what is called a sacrificial anode. The coatings that are applied to the flat metal product in the course of production must withstand the stress during forming to the component. The abrasion can cause scratches, pits and dents, up to the degree of component failure. A major influence on abrasion characteristics, especially of a zinc or zinc-containing coating, is possessed by the roughness of the sheet surface. In general, in the forming, forming aids such as forming oils, for example, are used, and these are intended to prevent direct metallic contact between tool surface and sheet surface. The surfaces slide against one another, with mutual rubbing of elevations in the surface of one contact partner through the surface of the other contact partner, in this way causing striated depressions. The longer the distance that the point stresses cover lead without interruption on the surface, the more severe the striations that can arise.

The roughness of the sheet surface may be varied via parameters including the choice of coating system and the application of suitable textures.

The textures are usually applied to the surface of the flat metal products by skin-pass rolling. In skin-pass rolling, two skin-pass rolls in a skin-pass roll mill are used, between which the flat metal product is guided, such that the upper skin-pass roll acts on the top side and the lower skin-pass roll on the bottom side of the flat metal product, and these impart a corresponding texture to the surfaces on the top and bottom sides of the flat metal product depending on the structure of the skin-pass rolls. Convex structures on the surface of the skin-pass rolls give a concave embossment on the surface of the flat metal product, or in other words an elevation on the surface of the skin-pass roll creates a depression on the surface of the flat metal product, especially according to the configuration of the structure and depending on the skin-pass reduction.

Skin-pass rolls may be produced by stochastic structuring methods, usually by what is called the EDT method; see by way of example EP 2 006 037 B1.

Roll surfaces may be provided with a structure in a targeted manner by means of microlithography. For instance, U.S. Pat. No. 5,532,051 discloses circular and square structures that are produced in repeating sequence in a square pattern by means of lithography on a roll and, in the rolling operation, can be transferred to the surface of the flat product to improve the forming properties.

Publication DE 689 10 866 T2 also describes cup-shaped depressions in a rectangular or hexagonal arrangement as being advantageous for forming purposes, but not optimal in terms of paint appearance.

By means of laser beam bombardment, it is possible to achieve controlled establishment of structures in deterministic arrangement (see by way of example EP 2 892 663 B1) on a skin-pass roll surface, which are transferred to the flat product on skin-pass rolling, and such skin-pass rolled flat products can contribute to an improvement in forming and paint appearance.

By means of pseudostochastic surfaces, it is said to be possible to avoid Moiré effects (see US 2019/0337032 A1) with irregular arrangement of circular elevations having a diameter of 50-150 μm that overlap by less than 10% and the number of which per $mm^2$ has a scatter of less than 20%.

Flat metal products can also be textured directly by laser bombardment, as described in WO 2017/125497 A1.

WO 2021/053088 A1 discloses surfaces where the positions of the depressions are varied by random generator. Mathematical models are presented, which are said to be generatable either by laser-structured skin-pass rolls or else by direct laser texturing of the sheet metal surface.

WO 2021/013938 A1 discloses a texture that can be created by direct laser texturing, which is configured in order to reduce or even avoid abrasion on coated steel sheets to be formed, and hence adhesion to the tool surfaces that come into contact with the steel sheets. A prerequisite for this purpose is that the material faces between the depressions have very low radius on the flat sheet metal surface.

Phenomena of surface failure with abrasion and adhesion occur not just in the case of zinc-coated steel materials in particular but also in the case of aluminum-coated steel materials, especially in the case of what is called indirect hot forming, and also in the case of (uncoated) aluminum materials, since depending on the alloy, the mechanical properties of aluminum differ only slightly compared to zinc, in strength inter alia.

With regard to the prior art, it is therefore desirable to provide a skin-pass rolled flat metal product having a surface texture that causes essentially only low abrasion, if any, and less adhesion on forming.

A first teaching of the invention relates to a skin-pass rolled flat metal product with a texture having on the top side and/or bottom side of the flat metal product flat metal product with a texture having on the top side and/or bottom side of the flat metal product and with an average peak-to-valley height difference $d_{mv}$ and an average distance from the valley edge $r_v$, wherein the product of $d_{m-v}$ and $r_v$ is at least 18 $\mu m^2$.

The texture preferably exists in the form of depressions and lands arranged between the depressions, wherein the texture is based on a repeating pattern arranged in a grid. The texture comprises, as well as the average peak-to-valley $d_{m-v}$ and the average distance from the valley edge $r_v$, for example, further indices selected from the group of arithmetic mean roughness Ra, peak count RPc, material content $M_r$, average distance from the peak edge $r_v$ and maximum values of the inner radius of the peak $r_{m,max}$ and of the inner radius of the valley $r_{v,max}$, and optionally the arithmetic mean waviness Wsa.

In the context of the invention, it has been found that the tendency to form abrasion depends on the leveling characteristics of the surface. Surfaces having high resistance to leveling have lower abrasion.

The roughness indices such as arithmetic average roughness Ra and peak count RPc, according to DIN EN 10049:

2014.03, in the case of deterministic surfaces should be implemented outside the principal texture directions. In the case of a hexagonal grid with basic directions of 30° or 60°, a measurement direction of 45°±5° to rolling direction is recommended. Since a hexagonal grid is invariant with respect to rotations by 60° and measurement directions could be rotated by 90°, a measurement orientation of 15°±m·30° is also admissible for integer values of m ($m \in \mathbb{Z}$).

The same considerations relating to measurement direction are applicable to the waviness index Wsa according to September 1941. The profile indices Ra, RPc and Wsa can be determined by tactile or contactlessly measuring systems. The height values z(x) in a measurement length L should be centered:

$$\int_0^L z(x')dx' = 0$$

The arithmetic average roughness Ra is $$R_a = \frac{1}{L}\int_0^L |z(x')|dx'$$

The material fraction $M_r$, depending on the section plane c, is $$M_r(c) = \frac{1}{L}\int_0^L \begin{cases} 1 & \text{when } z(x') \geq c \\ 0 & \text{otherwise} \end{cases} dx'$$

Peaks are considered to be the height values z(x) above the section line c=0, and valleys to be the values below that line. The proportion of peaks in the surface topography is $M_r(0)$, $M_r$ for short; the proportion of valleys is $(1-M_r(0))$, $(1-M_r)$ for short. The average height of the peaks $h_m$ is:

$$h_m = \int_0^L \begin{cases} z(x') & \text{when } z(x') \geq 0 \\ 0 & \text{otherwise} \end{cases} dx' \bigg/ \int_0^L \begin{cases} 1 & \text{when } z(x') \geq 0 \\ 0 & \text{otherwise} \end{cases} dx',$$

and the average depth of the valleys $t_v$ is:

$$t_v = -\int_0^L \begin{cases} z(x') & \text{when } z(x') < 0 \\ 0 & \text{otherwise} \end{cases} dx' \bigg/ \int_0^L \begin{cases} 1 & \text{when } z(x') < 0 \\ 0 & \text{otherwise} \end{cases} dx'.$$

Because of the centering of the height values:

$$h_m M_r = t_v(1-M_r) \text{ and}$$
$$R_a = h_m M_r + t_v(1-M_r),$$

The average peak-to-valley height difference $d_{m-v}$ can be calculated as follows from the indices Ra and $M_r$:

$$d_{m-v} = h_m + t_v = \frac{R_a}{2 \cdot M_r} + \frac{R_a}{2 \cdot (1-M_r)} = \frac{R_a}{2 \cdot M_r \cdot (1-M_r)}$$

These indices and their relationships to one another are also applicable in the same form to height values z(x, y) measured in terms of area. Surface topography can be surveyed in terms of area, for example, using a confocal microscope, especially with a lateral resolution of about 1.56 μm. The preferred measurement area is at least 1 mm². In the case of sheet curvature and large measurement areas, it may be necessary to eliminate fractions of the shape by standard filter methods, for example with a Gaussian filter having a limiting wavelength of λc=1.0 mm. The topography measurement data should be centered, or in other words the average value thereof should be subtracted from the height values. A height value z(x, y) is referred to as a point on a peak when z(x, y)≥0. A point is in a valley when z(x, y)<0. The shortest distance of a point (x,y) on a peak from a point in a valley is:

$$r_m(x, y) = \min\left(\left\{\sqrt{(x-x') + (y-y')}\,|z(x', y') < 0\right\}\right) \text{ when } z(x, y) \geq 0.$$

The shortest distance of a point (x,y) in a valley from a point on a peak is:

$$r_v(x, y) = \min\left(\left\{\sqrt{(x-x') + (y-y')}\,|z(x', y') \geq 0\right\}\right) \text{ when } z(x, y) < 0.$$

The (maximum) inner radius of the greatest peak area is $$r_{m\_max} = \max(r_m(x, y)),$$

and the (maximum) inner radius of the greatest valley area is $$r_{v\_max} = \max(r_v(x, y)).$$

The average $r_m$ over the measurement area F is a measure of the fine structure of the peaks $$r_m = \int\int_F \begin{cases} r_m(x', y') & \text{when } z(x', y') \geq 0 \\ 0 & \text{otherwise} \end{cases} dx'dy' \bigg/ \int\int_F \begin{cases} 1 & \text{when } z(x', y') \geq 0 \\ 0 & \text{otherwise} \end{cases} dx'dy'$$

and the average value $r_v$ is a measure of the fine structure of the valleys $$r_v = \int\int_F \begin{cases} r_v(x', y') & \text{when } z(x', y') < 0 \\ 0 & \text{otherwise} \end{cases} dx'dy' \bigg/ \int\int_F \begin{cases} 1 & \text{when } z(x', y') < 0 \\ 0 & \text{otherwise} \end{cases} dx'dy'$$

The sum of $r_m+r_v$ is inversely proportional to the peak count RPc. The product $$A_{resist} = r_v \cdot d_{m-v}$$

has been found to be a main criterion for characterizing the resistance to abrasion $A_{resist}$ of the surfaces. The higher $A_{resist}$ is, the more favorable the behavior of the surfaces on forming.

The texture thus has a resistance to abrasion $A_{resist}$ of at least 18 $\mu m^2$, especially at least 20 $\mu m^2$, preferably at least 22 $\mu m^2$. $A_{resist}$ may be limited to not more than 200 $\mu m^2$, especially not more than 150 $\mu m^2$, preferably not more than 120 $\mu m^2$, more preferably not more than 100 $\mu m^2$.

"Flat metal product" means metal sheets produced or comparable strips and other rolled products made from a metal material, which may be a metal or a metal alloy. Useful metal or metal alloy preferably includes steel or steel alloy, or alternatively aluminum or aluminum alloy.

A skin-pass rolling operation embosses repeating depressions into the surface of the flat metal product, which are separated from one another by lands. The depressions form liquid pockets for accommodation of a forming aid that promotes forming, for example for accommodation of a forming oil. In order that the lands can be better wetted with a sufficient amount of the forming aid, in particular, excessively narrow land widths or even roughness peaks on the surface of the flat metal product should be avoided. The lands between the depressions are formed in conjunction with the geometry of the depressions such that they are robust to leveling. The lands may preferably take the form of a coherent region (plateau), and hence be connected as a coherent land region. In this respect, for example, friction characteristics are affected not only by the proportion of the area of the lands, but also by the geometry thereof, such as width and length. This is attributable in particular to the fact that the stress is composed of two superposed constituents. The compressive stress acting in the normal direction brings about deformation of the surface. In particular, the actual contact area between two rough surfaces is only a few percent of the total area. It is thus possible for a higher pressure to a considerable degree to arise locally on the surface than can first be assumed with regard to the total area. The local pressure can then lead to plastic surface alteration. The larger the area of the local contact areas between the rough flat metal product surface and the tool surfaces, the smaller the local forces acting at the microscale level that can lead to plastic deformation of the surface. This static stress on forming is superposed with a relative movement in the plane of the sheet (dynamic stress), such that drawing traces can arise. The longer the distances covered here, the more significant these traces can become, up to and including unwanted striations on the surface. In this respect, for example, the material areas, or peak-valley fractions, should not become too broad either.

The textures underlying the invention are based on repeating shape elements arranged in a grid. The underlying lattice distances in the range from 50 μm, especially from 70 μm, preferably from 100 μm, to 500 μm, especially to 450 μm, preferably to 380 μm.

The shape elements consist of individual depressions which, in top view, are especially in polygonal form, for example in triangular, quadrangular or hexagonal form, especially in the form of an equilateral triangle or hexagon.

The pattern comprising multiple adjacent individual depressions is thus apparent in recurrent form on the flat metal product surface, especially in skin-pass rolling direction, and transversely thereto. The axes of symmetry may be in the skin-pass rolling direction or transversely thereto, but also rotated at a defined angle.

Skin-pass rolls/roll pairs are used that have appropriate structuring and are capable of providing a single- or double-sidedly skin-pass rolled flat metal product with the aforementioned indices. Suitable means of processing or structuring the surfaces of the skin-pass rolls are thus lasers, especially short-pulse lasers. Corresponding laser structuring methods and also apparatuses for performing the laser structuring are prior art; cf., as well as EP 2 892 663 B1, also EP 3 172 006 B1 and EP 3 877 112 A1. In this way, the creation of structures on the surface of the skin-pass roll is possible, which, by laser bombardment, bring about ablation, i.e. removal of material in the region of the incidence of bombardment, on the surface. By controlled adjustment, the laser shots may overlap or have such a large separation that a virtually original state remains between the laser shot areas. The regions unaffected by the laser bombardment thus form an elevation or elevations on the skin-pass roll surface. Complete transference of the surface structure of the skin-pass roll to the surface of the flat metal product to be skin-pass rolled is virtually impossible; instead, essentially only the significant parts, for example the elevations of the surface profile of the skin-pass roll, will penetrate into the surface of the flat metal product to be skin-pass rolled and hence impart a new appearance or characteristic to the surface of the flat metal product after skin-pass rolling, which differs from the state prior to skin-pass rolling. The skin-pass roll surface with its elevations (positive mold) forms a surface texture via force acting on the surface of the optionally coated flat metal product, which is thus only partly embossed in the surface of the steel sheet or surface of the optionally coated flat metal product having corresponding depressions (negative mold).

The texture on the surface of the flat metal product, whether uncoated or coated, meets the following criteria, for example:

- the arithmetic mean roughness Ra is at least 0.50 μm, especially at least 0.60 μm, preferably at least 0.70 μm, and at most 5.0 μm, especially at most 4.0 μm, preferably at most 3.0 μm;
- the peak count RPc is at least 30 1/cm, especially at least 40 1/cm, preferably at least 50 1/cm, and at most 200 1/cm, especially at most 150 1/cm, preferably at most 110 1/cm, more preferably at most 90 1/cm;
- the material fraction $M_r$ is at least 30%, especially at least 35%, preferably at least 40%, and at most 65%, especially at most 60%, preferably at most 57%;
- the average peak-to-valley height difference $d_{m-v}$ is at least 1.0 μm, especially at least 1.5 μm, and at most 8.0 μm, especially at most 7.0 μm, preferably at most 5.5 μm;
- the maximum inner radius of the peaks $r_{m,max}$ is at least 14 μm, especially at least 16 μm, preferably at least 18 μm, and at most 50 μm, especially at most 40 μm, preferably at most 30 μm;
- I the maximum inner radius of the valleys $r_{v,max}$ is at least 20 μm, especially at least 25 μm, preferably at least 30 μm, and at most 100 μm, especially at most 80 μm, preferably at most 70 μm;
- the average distance from the peak edge $r_m$ is at least 4 μm, especially at least 5 μm, preferably at least 6 μm, and at most 40 μm, especially at most 30 μm, preferably at most 20 μm;
- the average distance from the valley edge $r_v$ is at least 4 μm, especially at least 5 μm, preferably at least 6 μm, and at most 40 μm, especially at most 30 μm, preferably at most 25 μm.

If the flat metal product of the invention is intended, for example, for outer skin use in vehicle construction, a further index may be taken into account: the arithmetic mean waviness Wsa is >0 μm and especially not more than 0.30 μm, preferably not more than 0.25 μm, more preferably not more than 0.20 μm, further preferably not more than 0.15 μm, further preferably not more than 0.13 μm.

Waviness assumes small values in particular even in the case of relatively high roughness. The ratio of arithmetic mean waviness Wsa to arithmetic mean roughness Ra is preferably less than 0.3, more preferably less than 0.25, especially preferably less than 0.2.

The indices should each be essentially considered to mean the averages over the bottom side and/or top side of the skin-pass rolled (coated) flat metal product in question.

The flat metal part of the invention is a skin-pass rolled and/or straightened flat metal product.

The flat metal product of the invention may be a steel sheet, either in uncoated or preferably coated form. If the steel sheet has been coated, the coating of the coated steel sheet comprises a metallic coat.

In one configuration, the steel sheet has been coated with a zinc-based coat applied by hot-dip coating. The coat may comprise not only zinc and unavoidable impurities but also additional elements such as aluminum with a content of up to 8% by weight, especially up to 5% by weight, and/or magnesium with a content of up to 8% by weight, especially up to 5% by weight, in the coat. Sheet steels with a zinc-based coat have very good cathodic corrosion protection and have been used in automotive construction for many years. If improved corrosion protection is intended, the coat additionally comprises magnesium in a content of at least 0.3% by weight, in particular of at least 0.6% by weight, preferably of at least 0.9% by weight. Aluminum may be present alternatively or additionally to magnesium with a content of at least 0.1% by weight, especially of at least 0.3% by weight, in order for example to improve binding of the coat to the sheet steel and in particular to essentially avoid diffusion of iron out of the sheet steel into the coat during heat treatment of the coated sheet steel, in order that good suitability for adhesion, for example, can be assured. A thickness of the coat here per side may be between 1.5 and 30 μm, in particular between 2 and 20 μm, preferably between 3 and 15 μm. Below the minimum limit, sufficient cathodic corrosion protection may not be ensured, and above the maximum limit, there may be joining problems when the sheet steel according to the invention or a component fabricated from it is being joined to another component, in particular, if the specified maximum limit on the thickness of the coat is exceeded, a stable process during thermal joining or welding may not be ensured.

If proportions of magnesium and aluminum are present in the coat alongside zinc and unavoidable impurities, the coat or coating is known in the specialist field as zinc-magnesium, ZM or Zn—Al—Mg.

In a preferred variant, the aluminum content of the melt is 1.1% to 8% by weight, especially 1.2% to 5% by weight.

In a preferred variant, the magnesium content of the melt is 1.1% to 8% by weight, especially 1.2% to 5% by weight.

The coat may also contain zinc with minor aluminum constituents alongside unavoidable impurities, also known by the designation "Z" among specialists.

Unavoidable impurities present in the coat may, for example, be elements from the group of silicon, antimony, lead, titanium, calcium, manganese, tin, lanthanum, cerium and chromium, individually or in combination with a total of up 0.5% by weight, especially up to 0.3% by weight.

Skin-pass rolling in the case of provision of a steel sheet with a metallic coating applied by hot-dip coating generally follows after the coating, meaning that the embossing of a surface texture on the top side and/or on the bottom side of the steel sheet is effected on the coated steel sheet.

In an alternative configuration, the steel sheet has been coated with a zinc-based coat applied by electrolytic coating. A thickness of the coat here per side may be between 1.5 and 20 μm, in particular between 2 and 15 μm, preferably between 3 and 12 μm.

In a further alternative configuration, the steel sheet has been coated with a zinc- or aluminum-based coat that has been applied by PVD coating. A thickness of the coat here per side may be between 1.5 and 20 μm, in particular between 2 and 15 μm, preferably between 3 and 12 μm.

Skin-pass rolling in the case of provision of a steel sheet with a metallic coating applied by electrolytic coating or PVD coating generally precedes the coating, meaning that the embossing of a surface structure on the top side and on the bottom side of the steel sheet is effected on the uncoated steel sheet.

In a further alternative configuration, the steel sheet has been coated with an aluminum-based coat. It is possible here for the coat to include not only aluminum and unavoidable impurities but also up to 15% by weight of Si, optionally up to 4% by weight of Fe, optionally up to 1.0% by weight of alkali metals or alkaline earth metals.

In a preferred variant, the silicon content is either 0.2% to 4.5% by weight or 7% to 13% by weight, especially 8% to 11% by weight.

In a preferred variant, the optional content of iron is 0.2% to 4.5% by weight, especially 1% to 4% by weight, preferably 1.5% to 3.5% by weight.

In a preferred variant, the optional content of alkali metals or alkaline earth metals is 0.01% to 1.0% by weight of magnesium, especially 0.1% to 0.7% by weight of magnesium, preferably 0.1% to 0.5% by weight of magnesium. In addition, the optional content of alkali metals or alkaline earth metals may especially comprise at least 0.0015% by weight of calcium.

In a further alternative configuration, the steel sheet has been coated with an aluminum-based coat. In this case, the coat may comprise, as well as aluminum and unavoidable impurities, 2% to 24% by weight of zinc, 1% to 7% by weight of silicon, optionally 1% to 8% by weight of magnesium if the silicon content should be between 1% and 4% by weight, optionally up to 0.3% by weight in total of lead, nickel, zirconium or hafnium.

Unavoidable impurities present in the coat may, for example, be elements from the group of antimony, lead, titanium, manganese, tin, lanthanum, cerium and chromium, individually or in combination with a total of up 0.5% by weight, especially up to 0.3% by weight.

The steel sheet consists of a steel material including, as well as iron and unavoidable impurities, alloy elements such as carbon, silicon, manganese and aluminum, although other constituents may also be present individually or in combination, for example titanium, chromium, boron and/or, according to the use and strength class. It is known among specialists which steel materials are suitable depending on use, especially in vehicle construction, for production of cold-formed and indirectly hot-formed components.

Alternatively, the (skin-pass rolled) flat metal product may also be an aluminum sheet.

In a second teaching, the invention relates to a component produced by cold forming from a flat metal product of the invention made from steel (alloy) or aluminum (alloy).

The component may be an outer skin part that may be used in automobile construction. The outer skin part is thus intended for moving parts such as doors and hatches, but also for vehicle roofs, fenders etc. Alternatively, the component may also be a structure part for automobile construction. Use in the chassis area is also conceivable.

In a third teaching, the invention relates to a component produced by indirect hot forming from a flat metal product of the invention made from steel (alloy).

The component may be a structure part that may be used in automobile construction. The structure part is thus as part of the chassis, for example pillars (B pillars), main beams and crossbeams (including shock absorbers).

In one configuration of the component of the invention, the component has been painted.

Skin-pass rolled flat metal products of the invention offer benefits in respect of forming by comparison with the prior art. Evidence was provided with the aid of what is called the multi-frottement test (MFT). Different sheet steels (interstitial-free steel IF, bake-hardening steel BH and dual-phase steel DP) having a thickness of 0.6 mm to 0.7 mm with different hot dip coatings (Z and ZM) having a thickness of 7 μm on each side were subjected to skin-pass rolling on both sides with different skin-pass rolls (different structures), with a skin-pass reduction between 1% and 1.5%. The surface textures on the coated steel sheet that were created with the different skin-pass rolls, on average, have the indices given in table 1.

The surfaces of samples 1 to 6 correspond to the prior art. Sample 1 (IF with Z) and sample 2 (BH with Z) have a stochastic texture according to the teaching from EP 2 006 037 B1, where the surfaces of the skin-pass rolls have been processed by EDT texturing methods and subsequent superfinishing (SF). In the case of sample 3 (BH with ZM), an EDT skin-pass roll without SF was used.

Samples 4 (IF with Z), 5 (DP with Z) and 6 (BH with ZM) have a deterministic texture in the form of a chessboard pattern, where the surfaces of the skin-pass rolls have been created by pulsed laser texturing in accordance with the teaching of EP 2 892 663 B1.

MFT, also called the Renault test, is a customary method of examining the abrasion characteristics of surfaces. In accordance with the "Renault D31 1738/C" test method, a strip of the material to be tested is pulled repeatedly between a flat and a round friction jaw having a diameter of 20 mm. The toolsets have been manufactured from 1.3342 material with hardness >60HRC with a grinding roughness Ra of 0.1 μm. The round friction jaw, because the contact is linear, leads to higher contact pressure on the samples. For the test procedure, five sample strips of each of samples 1 to 10 of dimensions 700×50 $mm^2$ were cut, cleaned, degreased and oiled with a PL 3802 S lubricant at 1.5 $g/m^2$. The strips were successively clamped in the clamping device and pulled through the two friction jaws over a measurement distance of 50 mm. The testing speed was 5 mm/s; the contact force or normal force FN was kept constant at 5 kN throughout the test. The required tensile forces $F_D$ and the distance were recorded during the test at a recording rate of 10 Hz. The operation was pulled in five repetitions at the same place for each strip without cleaning the tool or the strip. Once the five strips had been pulled through the tool five times, the tool was assessed with regard to its condition in terms of abrasion and wear.

The coefficient of friction $$\mu_{(n)} = \frac{F_D}{2F_N}$$

has been ascertained as an average on each strip in the nth pull. The coefficient of friction $\mu_1$ varied slightly in the first pull between 0.11 and 0.14 irrespective of the zinc coat from the melt (Z or ZM). Given the same texture (EDT, double-I etc.), the variants having higher roughness (cf. Ra value in table 1) have a higher coefficient of friction (see table 2).

TABLE 1

| Sample No. | Texture | Ra [μm] | RPc [1/cm] | Wsa [μm] | Mr [%] | $d_{m-v}$ [μm] | $r_{m, max}$ [μm] | $r_{v, max}$ [μm] | $r_m$ [μm] | $r_v$ [μm] | $A_{resist}$ [$μm^2$] |
|---|---|---|---|---|---|---|---|---|---|---|---|
| 1 | EDT | 0.81 | 89 | 0.20 | 54.4 | 1.63 | 32.1 | 33.0 | 7.5 | 6.3 | 10.3 |
| 2 | EDT | 1.22 | 107 | 0.25 | 52.7 | 2.45 | 27.6 | 26.7 | 6.7 | 6.4 | 15.7 |
| 3 | EDT | 1.16 | 97 | 0.21 | 56.1 | 2.36 | 31 | 26.5 | 7.4 | 6.0 | 14.1 |
| 4 | Double I | 0.92 | 124 | 0.13 | 56.9 | 1.88 | 16.4 | 22.6 | 4.4 | 6.3 | 11.8 |
| 5 | Double I | 1.32 | 137 | 0.18 | 46.1 | 2.66 | 17.3 | 20.9 | 4.1 | 5.3 | 14.1 |
| 6 | Double I | 0.89 | 129 | 0.08 | 49 | 1.78 | 13.2 | 17.9 | 3.8 | 5.7 | 10.2 |
| 7 | Triangle | 1.47 | 82 | 0.06 | 53.5 | 2.95 | 24.3 | 30.5 | 8.6 | 10.0 | 29.5 |
| 8 | Triangle | 1.65 | 83 | 0.10 | 52.7 | 3.31 | 23.7 | 31.3 | 7.9 | 10.1 | 33.4 |
| 9 | Triangle | 2.19 | 85 | 0.1 | 50.8 | 4.38 | 23.1 | 30.8 | 8.2 | 11.0 | 48.2 |
| 10 | Trapezium | 1.00 | 69 | 0.09 | 50.9 | 2.00 | 26.0 | 36.1 | 9.2 | 11.8 | 23.6 |
| 11 | Trapezium | 1.33 | 74 | 0.12 | 47.9 | 2.66 | 23.7 | 37.7 | 7.7 | 12.4 | 33.0 |
| 12 | Trapezium | 2.21 | 80 | 0.09 | 44.2 | 4.5 | 23.0 | 39.8 | 7.8 | 13.4 | 60.0 |
| 13 | Hexagon | 0.75 | 61 | 0.08 | 44.3 | 1.52 | 24.2 | 50.1 | 8.9 | 14.6 | 22.2 |
| 14 | Hexagon | 0.95 | 67 | 0.08 | 40.1 | 1.98 | 21.9 | 51.2 | 7.5 | 15.7 | 31.1 |
| 15 | Hexagon | 2.16 | 72 | 0.12 | 38.4 | 4.57 | 19.5 | 53.8 | 7.1 | 15.7 | 79.9 |
| 16 | Hexagon | 1.03 | 68 | 0.07 | 43.4 | 2.10 | 21.6 | 52.2 | 8.2 | 16.4 | 34.4 |

Samples 7 (IF with Z), 8 (DP with Z) and 9 (BH with Z) have a repeating pattern with the "triangle" texture according to the teaching of this invention.

Samples 10 (IF with Z), 11 (DP with Z) and 12 (BH with Z) have a repeating pattern with the "trapezium" texture according to the teaching of this invention.

Samples 13 (IF with Z), 14 (DP with Z), 15 (BH with Z) and 16 (DP with ZM) have a repeating pattern with the "hexagon" texture according to the teaching of this invention.

In the fifth pull, there is a clearer difference in coefficients of friction $\mu_5$, with values between 0.08 and 0.21. The higher the arithmetic mean roughness Ra, the lower the μ values with regard to the respective texture; cf. table 2.

In the case of the samples with Z coating according to the prior art (double I or EDT), friction increases continuously at least after the second pull. Only the ZM coating in the case of these textures leads to constantly decreasing μ values.

TABLE 2

| Sample No. | Texture | Coating | $\mu_1$ | $\mu_2$ | $\mu_3$ | $\mu_4$ | $\mu_5$ | Invention |
|---|---|---|---|---|---|---|---|---|
| 1 | EDT | Z | 0.129 | 0.145 | 0.165 | 0.188 | 0.195 | – |
| 2 | EDT | Z | 0.140 | 0.140 | 0.158 | 0.183 | 0.206 | – |
| 3 | EDT | ZM | 0.140 | 0.125 | 0.120 | 0.100 | 0.098 | – |
| 4 | Double I | Z | 0.119 | 0.127 | 0.159 | 0.181 | 0.205 | – |
| 5 | Double I | Z | 0.144 | 0.126 | 0.134 | 0.156 | 0.178 | – |
| 6 | Double | ZM | 0.120 | 0.085 | 0.084 | 0.082 | 0.082 | – |
| 7 | Triangle | Z | 0.119 | 0.107 | 0.101 | 0.099 | 0.095 | + |
| 8 | Triangle | Z | 0.143 | 0.136 | 0.12 | 0.107 | 0.101 | + |
| 9 | Triangle | Z | 0.135 | 0.110 | 0.092 | 0.086 | 0.084 | + |
| 10 | Trapezium | Z | 0.109 | 0.107 | 0.107 | 0.108 | 0.115 | + |
| 11 | Trapezium | Z | 0.139 | 0.128 | 0.115 | 0.108 | 0.100 | + |
| 12 | Trapezium | Z | 0.131 | 0.118 | 0.119 | 0.113 | 0.108 | + |
| 13 | Hexagon | Z | 0.113 | 0.111 | 0.12 | 0.136 | 0.151 | + |
| 14 | Hexagon | Z | 0.132 | 0.119 | 0.109 | 0.101 | 0.098 | + |
| 15 | Hexagon | Z | 0.135 | 0.119 | 0.117 | 0.116 | 0.111 | + |
| 16 | Hexagon | ZM | 0.119 | 0.100 | 0.085 | 0.076 | 0.078 | + |

The surfaces of the invention can reduce the rise in friction. Especially with the "triangle" texture, friction decreases constantly in each pull in spite of the zinc coat (Z) from the melt.

The test conducted shows that, as well as the coating, the texture of the sheet metal surface can also have a significant effect on friction in the case of coated flat metal products.

For that reason, details of the surfaces on the strips examined in the MFT were inspected by confocal microscopy before the first and after the third and fifth pulls, in order to analyze the change in the surface.

FIG. 1 compares the surfaces with a zinc coat (Z) from the melt after the third and fifth pulls with the unpulled surface. It is clearly apparent that, in the case of the "double I", the original texture is no longer apparent directly after the third pull. In the case of "EDT", certain relatively coarse depressions are still present, which can serve as lubrication pockets and to accommodate abrasion particles. After further stress, deeper grooves or striations are formed in the surface.

Surfaces with a zinc-based coat from the melt with added aluminum and magnesium (ZM) are very robust, by contrast, in the MFT. In the case of all textures, even in the case of EDT and "double I", the structures have not entirely disappeared after the fifth pull and no striations have formed.

The executions of the invention show much higher robustness and hence benefits for surfaces/surface coatings that otherwise have a significant tendency to abrasion. This behavior was demonstrated on aluminum-coated steel sheet and also on aluminum sheets as flat metal product, and the surface textures of the invention were likewise found to be better than the "EDT" and "double I" texture.

Leveling of the essentially rough surface by contact with the smooth tool surface is delayed, and so there is a greater reservoir for the volume of lubricant, which leads to lower friction and to less cold welding to the tool surfaces connected to the sheet during forming.

It has been found that textures having greater depth, the depressions of which have a greater cross section, are conserved for longer on contact with the tool. It can be concluded from this that the product $$A_{resist} = r_v \cdot d_{m-v}$$

should be as large as possible for a surface to be resistant to complete leveling and hence advantageously to adhesion or abrasion.

The texture pattern need not necessarily be in triangular or hexagonal design or correspondingly equivalent outlines such as hexalobe or trefoil, but may also take the form of polygons with multiple vertices, provided that the geometric provisions of the surface texture of the invention are observed.

Figure 2:
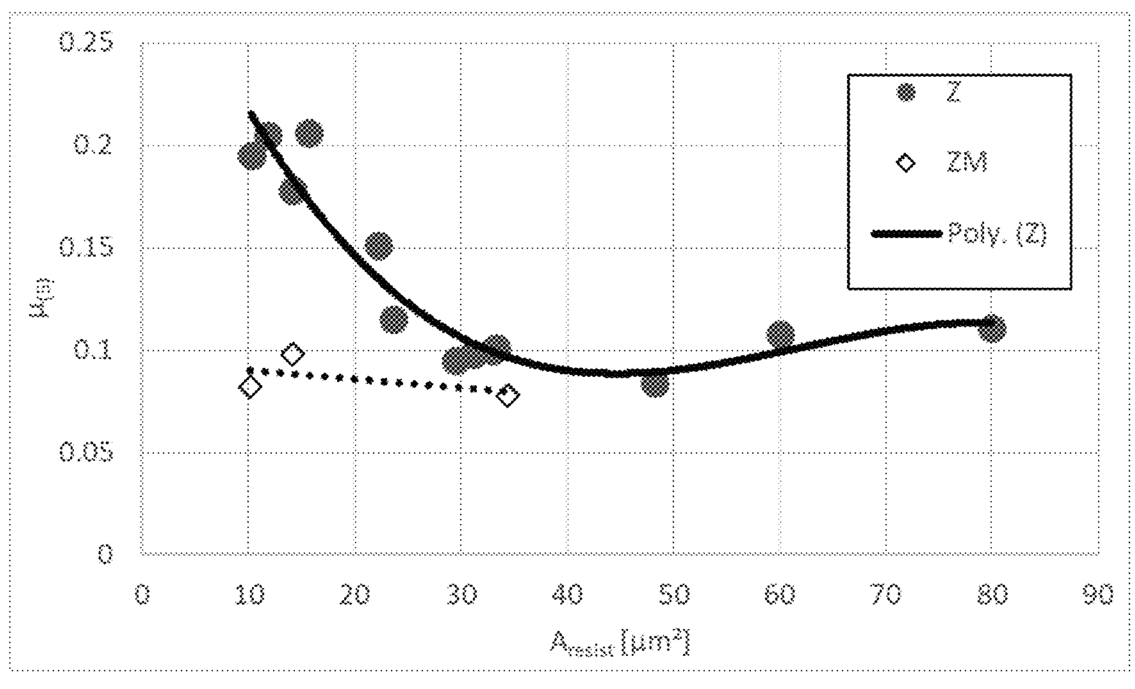

FIG. 2 shows how the coefficient of friction us in the fifth pull of the MFT varies with the index $A_{resist}$, the product of peak-to-valley height difference $d_{m-v}$ and average distance from the valley edge $r_v$ (cf. indices in tables 1 and 2) for Z and ZM. For the individual points in the coordinate system shown, a polygonal line was determined for Z and a fitted curve for ZM.

Figure 3:
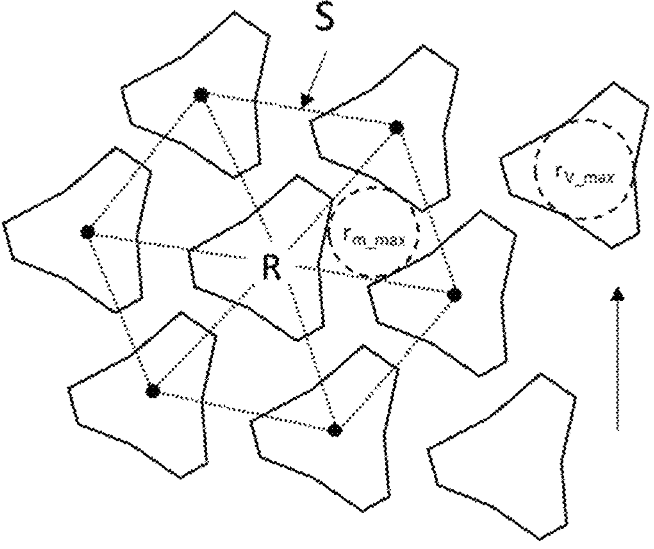
Figure 4:
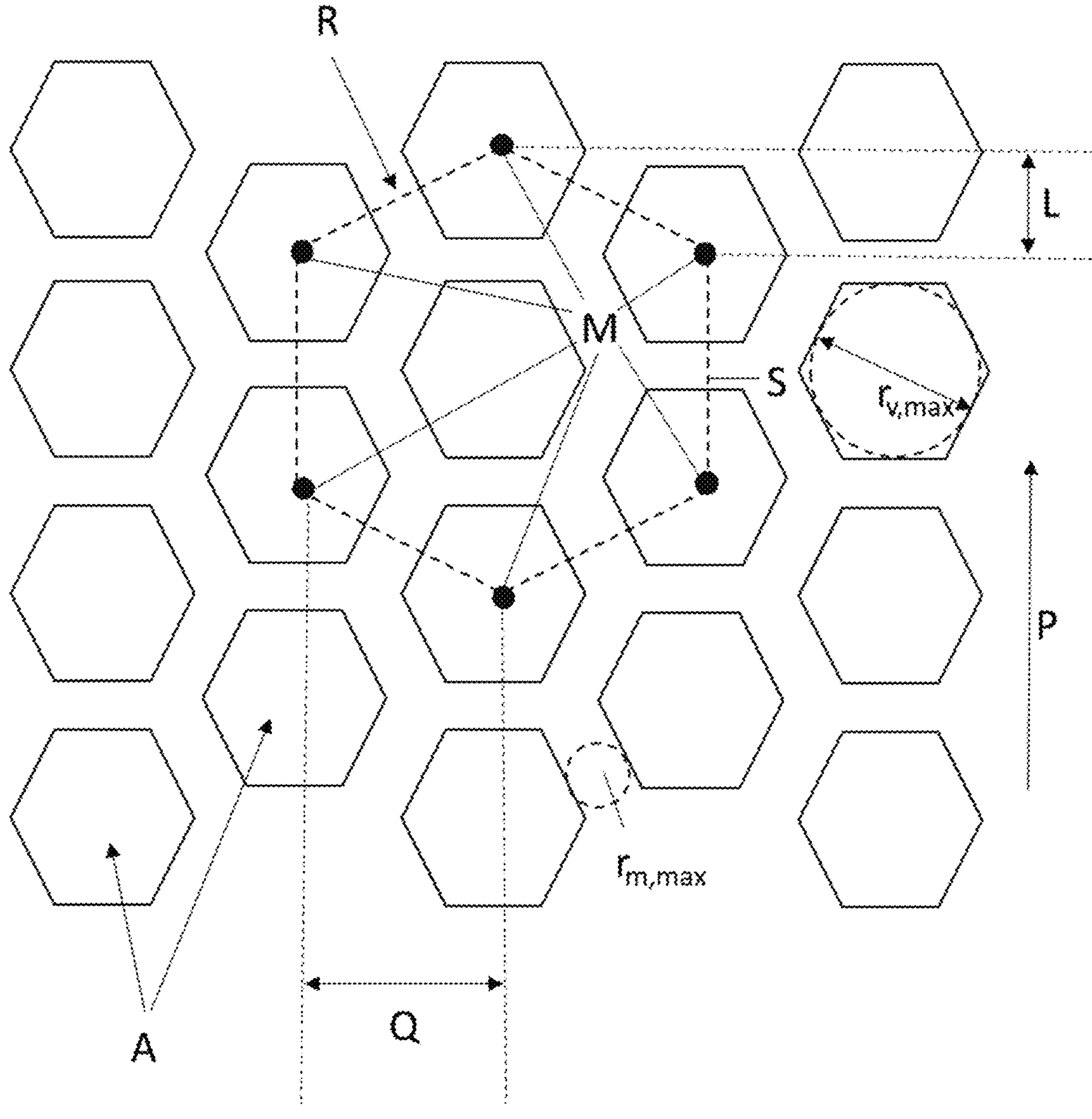

In FIGS. 3 and 4 are, for two illustrative texture specimens, namely for "triangle" A (cf. FIG. 3) and for "hexagon" A (cf. FIG. 4), the geometric relationships for determination of indices $r_m$ or $r_v$ and $r_{m,max}$ or $r_{v,max}$. The index $r_{m,max}$ is the inner radius of the largest peak, and so effectively the maximum inner radius of the peaks, and corresponds to the greatest distance between two depressions (A) as shown in FIGS. 3 and 4. The index $r_{v,max}$ is the inner radius of the largest valley, and so effectively the maximum inner radius of the valleys. The indices $r_m$ and $r_v$ correspond to the averages of all distances from the peak edge and from the valley edge, especially in the measurement area examined. The texture is based in each case on a repeating pattern, and hence a deterministic pattern, arranged in a grid R. The underlying pattern R consists of hexagonal shapes (FIG. 3 and FIG. 4) with an edge length S in the range from 50 μm to 500 μm. M is the centroid/center of a depression A. Lands are arranged between the depressions A, and the lands separate the individual depressions A from one another. The width of the lands, viewed in longitudinal extent, may vary between >0 μm and $r_{m,max}$. The arrow shown symbolizes the direction of skin-pass rolling.

Figure 5:
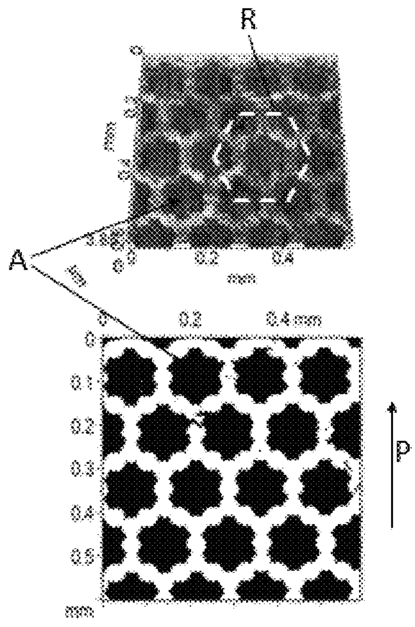

In FIG. 5, by way of example, a surface of a skin-pass rolled flat metal product has been surveyed by confocal microscopy, where the design corresponds essentially to a hexagonal depression A, but this cannot be created as a straight line as a result of the effect of the laser in the structuring of the skin-pass roll, but is composed of overlapping laser shots and hence results in a texture reminiscent of a hexalobe or else Torx texture; cf. also FIG. 1, lower diagram. In this example, a textured depth of 3.89 μm, an arithmetic mean roughness Ra of 0.95 μm, a peak count RPc of 67 1/cm and an arithmetic mean waviness Wsa of 0.08 μm were determined. The material fraction $M_r$ was 40%. This resulted in a peak-to-valley height difference $d_{m-v}$ of 1.98 µm. The maximum inner radius of the peak $r_{m,max}$ was 21.9 µm, and the maximum inner radius of the valley $r_{v,max}$ was 51.2 µm. The average distance from the peak edge Im at 7.5 µm and the average distance from the valley edge $r_v$ at 15.7 µm were each about one third less than the maximum inner radii. The triangle texture would correspond more to a trefoil texture; cf. "triangle" in FIG. 1.

The invention claimed is:

1. A flat metal product with a texture having on at least one of a top side and bottom side of the flat metal product and with an average peak-to-valley height difference $d_{m-v}$ and an average distance from the valley edge $r_v$, wherein the product of $d_{m-v}$ and $r_v$ is at least 18 $\mu m^2$, wherein (a) the resistance to abrasion Aresist is defined as the product of the average peak-to-valley height difference dm-v and the average distance from the valley edge rv, and Aresist is at least 18 $\mu m^2$; and (b) the texture consists of depressions and lands arranged between the depressions, the texture being based on a repeating pattern arranged in a grid having lattice distances in the range from 50 µm to 500 µm.

2. The flat metal product as claimed in claim 1, wherein the texture consists of depressions (A) and lands arranged between the depressions (A), wherein the texture is based on a repeating pattern arranged in a grid (R).

3. The flat metal product as claimed in claim 2, wherein the texture has an arithmetic mean roughness Ra between at least 0.50 µm and at most 5.0 µm.

4. The flat metal product as claimed in claim 2, wherein the texture has a peak count RPc between at least 30 1/cm and at most 200 1/cm.

5. The flat metal product as claimed in claim 2, wherein the texture has an average distance from the valley edge $r_v$ between at least 4 µm and at most 40 µm.

6. The flat metal product as claimed in claim 2, wherein the texture has an average distance from the peak edge $r_m$ between at least 4 µm and at most 40 µm.

7. The flat metal product as claimed in claim 2, wherein the flat metal product is a steel sheet and has been coated with a metallic coat.

8. The flat metal product as claimed in claim 1, wherein the flat metal product is an aluminum sheet.

9. The flat metal product as claimed in claim 7, wherein the steel sheet has been coated with a zinc-based coat applied by hot dip coating.

10. The flat metal product as claimed in claim 7, wherein the steel sheet has been coated with a zinc-based coat applied by electrolytic coating.

11. The flat metal product as claimed in claim 7, wherein the steel sheet has been coated with a zinc-based or aluminum-based coat applied by PVD coating.

12. The flat metal product as claimed in claim 7, wherein the steel sheet has been coated with an aluminum-based coat applied by hot dip coating.

13. The flat metal product as claimed in claim 7, wherein the arithmetic mean waviness Wsa at >0 µm and not more than 0.30 µm is taken into account as a further index.

14. A component produced by cold forming of a flat metal product as claimed in claim 2.

15. The component as claimed in claim 14, wherein the component is an outer skin component.

16. A component produced by hot forming of a steel sheet as claimed in claim 2.

17. The component as claimed in claim 14, wherein the component is a structure part.

18. The component as claimed in claim 17, wherein the component has been painted.

* * * * *